Feb. 9, 1960 S. N. BETTS ET AL 2,924,346

LOAD CARRIER HAVING HOLD-DOWN DEVICE

Filed March 14, 1957 2 Sheets-Sheet 1

INVENTORS
SANFORD N. BETTS
WILLIAM P. DOWNEY
BY
Buckhorn, Cheatham & Blore
ATTORNEYS

LOAD CARRIER HAVING HOLD-DOWN DEVICE

Filed March 14, 1957 2 Sheets-Sheet 2

INVENTORS
SANFORD N. BETTS
WILLIAM P. DOWNEY
BY
Buckhorn, Cheatham & Blore
ATTORNEYS United States Patent Office 2,924,346

Patented Feb. 9, 1960

2,924,346

LOAD CARRIER HAVING HOLD-DOWN DEVICE

Sanford N. Betts and William P. Downey, Portland, Oreg., assignors, by mesne assignments, to Hyster Company, a corporation of Nevada Application March 14, 1957, Serial No. 646,044

3 Claims. (Cl. 214—394)

This invention relates to load carriers having load hold-down devices, and in particular to load carriers having hold-down devices for handling loads composed of a plurality of units, such as boxes, cartons and the like. For convenience, such loads hereinafter frequently will be referred to as stacked loads, although such loads may comprise only a single layer of articles.

The hold-down devices of prior load carriers have been complex, expensive and bulky. Furthermore, prior hold-down devices have for the most part been designed to handle stacked loads composed of units of only a particular or single size, and thus have not been capable of properly engaging and handling loads composed of units of a wide range of sizes. Also, prior devices have for the most part not been capable of properly conforming to the irregularities of stacked loads, and even those which have been capable of conforming have been able to do so only by the application of relatively high pressures to the load. Frequently, the reason for high pressures has been that the prior devices have engaged stacked loads with thrust pressure only and with little or no lateral pressure.

The main object of the present invention is to provide a load carrier having a simple and inexpensive hold-down device overcoming the above disadvantages, and more in particular to provide such a device which is of relatively flat form and which is capable of yielding when engaging a stacked load to properly engage and hold different portions of the load in place.

A more particular object of the invention is to provide such a hold-down device of relatively flat form capable of applying lateral pressure to the stacked load at the place of contact therewith to enable the hold-down device properly to stabilize the load without applying excessive pressure thereto.

Another object of the invention is to provide an improved hold-down device.

In its more specific form, the load carrier of the present invention includes a support for the load to be carried and a hold-down device for engaging the load, the device having a frame provided with an opening which is spanned by flexible means for engaging the different units of the load to retain the same against dislodgment while the carrier is moving from one place to the other.

Various other objects of the present invention will be apparent from the following description taken in connection with the accompanying drawings wherein.

Figure 1:
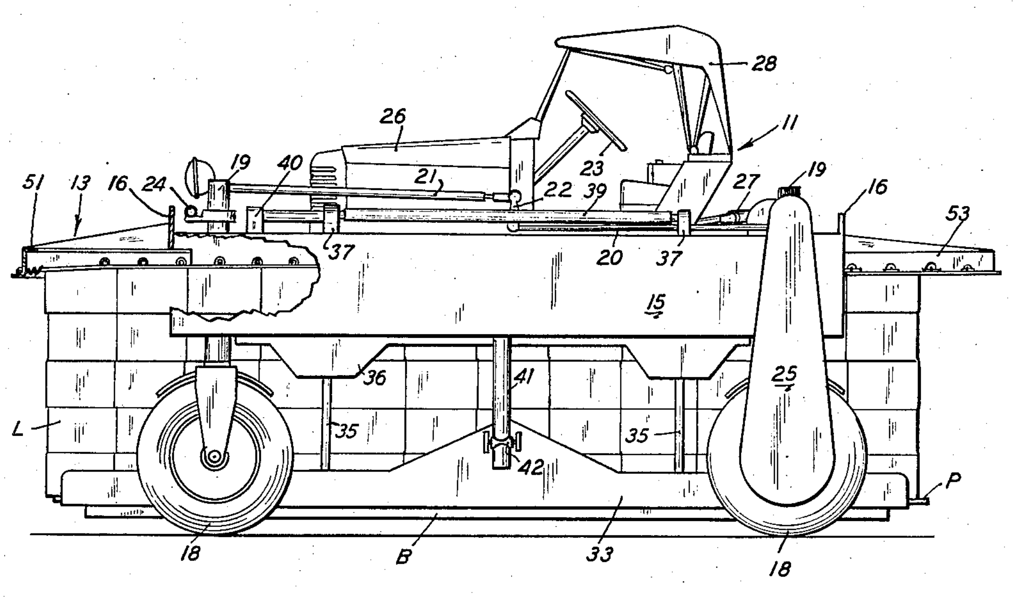
Fig. 1 is a side view of a straddle carrier embodying the concepts of the present invention, parts being broken away for convenience in illustration.
Figure 2:
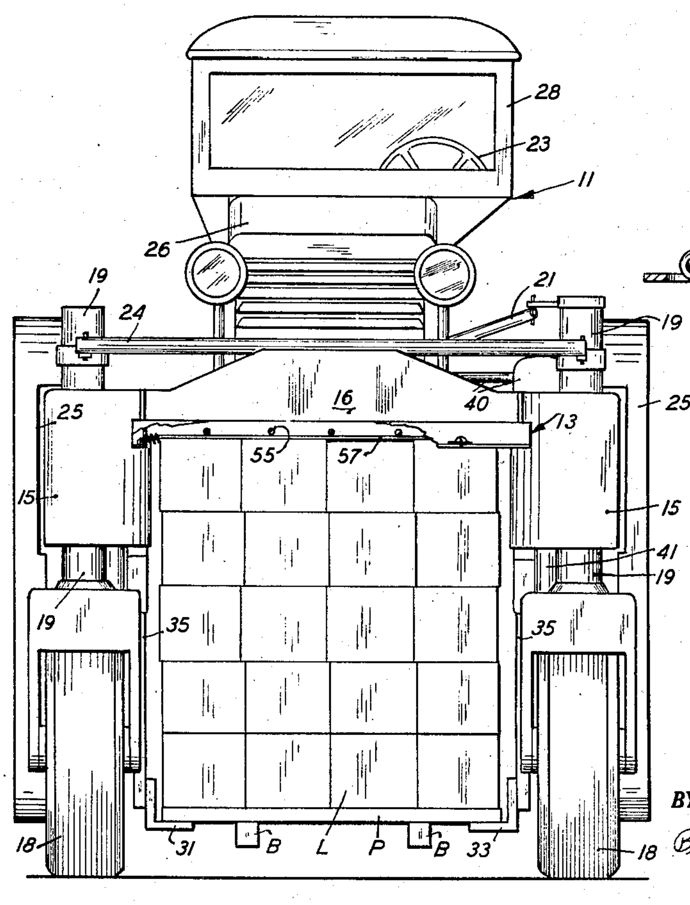
Fig. 2 is a front view of the carrier in Fig. 1, parts being broken away for convenience in illustration.

Referring particularly to Figs. 1 and 2, the drawings show a straddle carrier generally indicated at 11 having a hold-down device generally indicated at 13 mounted thereon. The straddle carrier 11, except as modified by the hold-down device, is of common construction, and thus the details of the carrier need not be fully discussed.

Figure 3:
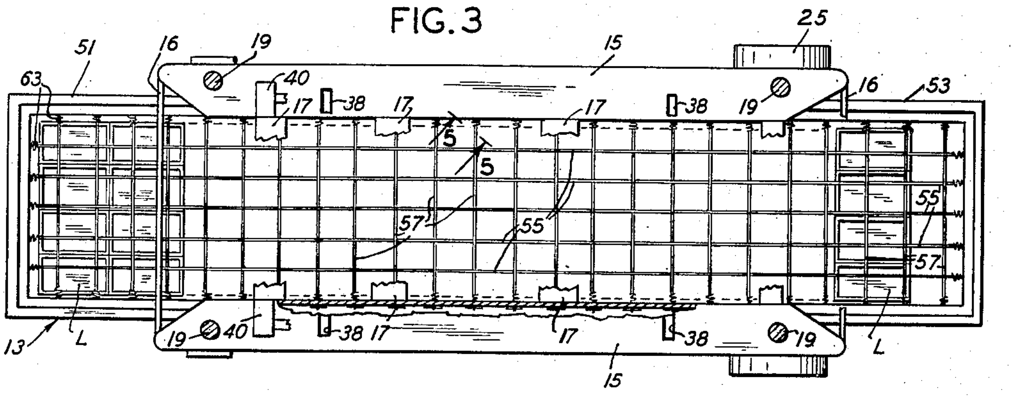
Fig. 3 is a plan view of the carrier with most of the upper structure broken away to more clearly show the construction of the hold-down device of the carrier.

More in detail, the carrier is of the type having a tunnel formed therethrough to permit the carrier to ride over a load to pick up the same. Accordingly, the carrier has a channel-shaped frame which extends the length of the machine and includes a pair of hollow side members 15 connected by various crosspieces 16 and 17, as is best shown in Figs. 1, 2 and 3.

The carrier is supported at both its front and rear ends by wheels 18 having stems or shafts 19 extending through and journaled in the side members 15. A steering mechanism controls the swiveling movement of the wheels, and includes links 20 and 21 operated by a lever 22 from the steering wheel 23, the remote ends of the links being connected to the upper ends of the stems or shafts of the wheels on the near side of the carrier, as the parts are shown in Fig. 1. A tie link 24 connects the front stems and a similar link, not shown, connects the rear stems.

The rear wheels 18 are driven by chain and sprocket drives covered by guards 25, which are best shown in Figs. 1 and 2, power being furnished by an engine 26 of the carrier through a conventional drive mechanism 27. A cab 28 for the driver is provided on the carrier frame behind the engine 26.

A pair of shoes 31 and 33 are provided on the carrier, as best shown in Fig. 2, for supporting and lifting a stacked load L, which is shown as being loaded on a pallet P which may be provided with bolsters B. Each lifting shoe is connected by a pair of upwardly extending lifting rods 35, as shown in the case of shoe 33 in Fig. 1, to a crosshead, not shown, which is movably received within a depending frame portion 36 on the associated side member 15. The crosshead is elevated and lowered in a conventional manner by chain drives 37 which extend through openings 38 in the side members 15 and are connected to the crossheads, the openings being shown in Fig. 3. The chain drives receive power through a suitable drive assembly 39 and 40 from the front end of the engine 26 in a conventional manner not shown.

A vertical guide member 41 is provided for each shoe, as shown in the case of shoe 33 in Fig. 1, the guide member being pivotally supported at its upper end within the associated side member 15, in a manner not shown, for inward and outward movement. The shoe 33 has rollers 42, one of which is shown in Fig. 1, engaging the guide 41. A suitable mechanism, not shown, is provided by which the operator may pivot the guide members 41, and thus the shoes 31 and 33, from outward positions to the inward positions shown in Fig. 2 to properly engage the edges of a load, in this case, the edges of the pallet P.

The hold-down device 13, previously mentioned, includes an open rectangular frame, as best shown in Fig. 3, which is provided by the side portions 15 of the carrier frame and by two U-shaped end pieces 51 and 53, each of which has its end portions secured to the ends of the side portions 15 of the carrier frame. Supported by the rectangular frame is a flexible net made up of a plurality of longitudinally extending cables 55 and a plurality of transversely extending cables 57. The cables are airplane shock cords and thus are resilient and extensible in the direction of their length, in contrast to wire cables which are not extensible and resilient. The cables 55 and 57 are not joined together at the places they cross one another, thus allowing the cables to shift relatively to one another.

Figures 4, 7:
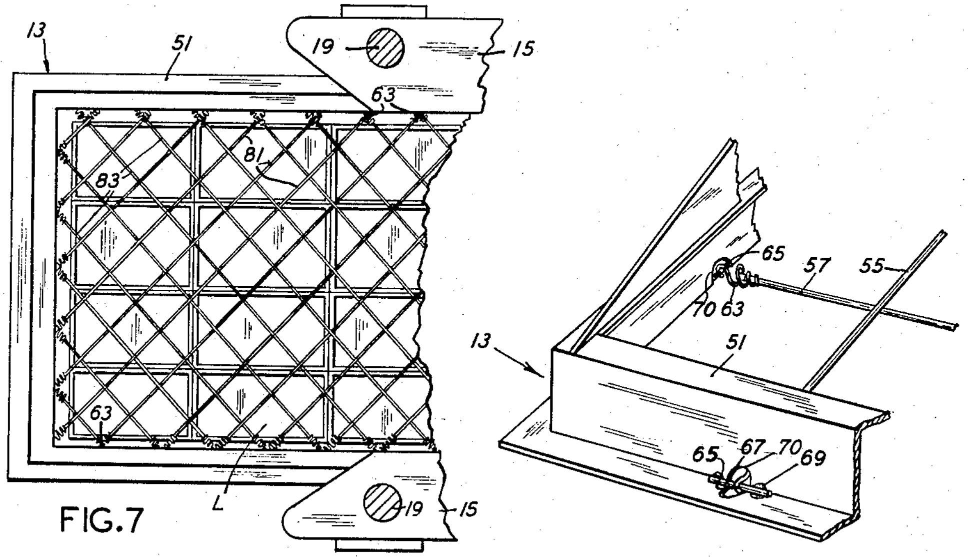
Fig. 4 is a perspective view of a corner of the hold-down device.
Fig. 7 is a plan view similar to the front portion of Fig. 3, but showing a modified form of the invention and being on an enlarged scale.
Figure 5:
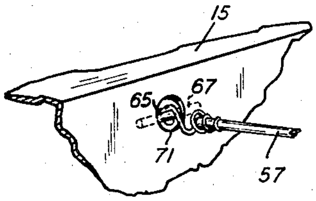
Fig. 5 is a fragmentary view on an enlarged scale taken generally in the direction of the arrows 5—5 in Fig. 3.
Figure 6:
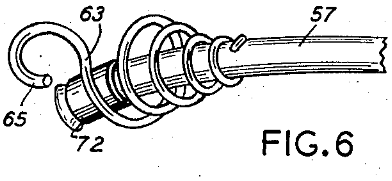
Fig. 6 is an enlarged perspective view showing the manner of connecting a cable to a connector.

The manner of fastening the ends of the cables in place is best shown in Figs. 4, 5 and 6 wherein it is apparent that a conical-shaped coil connector 63 is provided at each end of each cable and has a hook 65 extending through an opening in the rectangular frame and engaging a pin 67 spanning the opening and held in place such as by a pair of welds 69. The openings in the end pieces 51 and 53 are indicated by the reference numeral 70 in Fig. 4, and the openings in the inner side walls of the side members 15 are indicated by the reference numeral 71 in Fig. 5.

The manner of attaching a cable to a connector is best shown in Fig. 6 in which a cable 57 is shown. The cable fits through its coil connector 63 and has a ferrule or similar element 72 clamped on the end thereof, the ferrule being of a size to abut against the smaller portions of the coil connector to prevent the cable end from being withdrawn from the connector. It is apparent from Fig. 4 that the connectors 63 readily permit pivoting movement of the end portions of the cables relative to the pins 67.

In operation, the straddle carrier, with the shoes 31 and 33 moved to their outward positions, is driven over a stacked load L on a pallet P which is supported by its own bolsters B or by separate bolsters. The shoes 31 and 33 may thus slip under the edges of the pallet P, and thereafter be swung inwardly and then elevated to lift the load against the flexible hold-down net of the hold-down device to deform the net upwardly and to apply pressure to the upper surface of the load. The stacked load is shown as comprising a plurality of separate boxes, such as boxes of fruit, and, as well known to those skilled in the art, these boxes unavoidably are of slightly different sizes and the cumulative differences in the size of the boxes means that the boxes of the upper layer have the upper surfaces thereof disposed at different levels. With the flexible net of the present invention, the boxes at the sides and ends of the upper layer of boxes are securely and firmly held downwardly and in place by the resilient cables. The inner or centrally located boxes in the upper layer of boxes normally will also be engaged by the net, but this is not of particular importance, since, if the outer boxes at the top layer of boxes are securely held in place, all the boxes are effectively held in place.

It is pointed out, that were the cords 55 and 57 not extensible, the boxes would not be held down as securely, because the upward movement of the shoes 31 and 33 would be stopped at the place the first cable engaging the highest level of boxes was placed in a taut condition. However, with the net of the present invention, the first resilient cable which engages the highest level of boxes merely stretches to allow the other cables to firmly and securely engage their boxes despite differences in the levels thereof.

Figure 8:
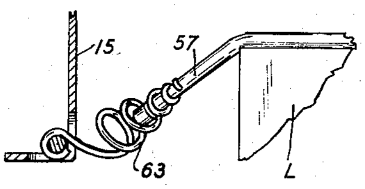
Fig. 8 is an enlarged fragmentary view showing more clearly the manner of engagement of a cable with a box.

As best shown in Fig. 8, the cables are deformed around the exposed corners of the boxes to apply lateral as well as downward pressure against the boxes to securely hold them in place with relatively light pressure requirements.

Fig. 7 shows a modified form of the invention in which the hold-down device includes an open rectangular frame similar to the frame in Fig. 3, similar parts being given similar reference numerals. In this form of the invention, the net is formed by diagonal cables which are arranged at 90 degrees relative to one another but which obliquely intersect the sides and ends of the open frame. One set of the cables is identified by reference numeral 81 whereas the other cables are indicated by the reference numerals 83. The ends of these cables are secured to the open frame by coil connectors 63 in the same manner that cables 57 and 55 are connected in place. By arranging the cables diagonally, a closer mesh is provided without requiring the provision of extra openings and end connectors. A closer mesh means that there are more cables engaging each box. The cables could be arranged to cross one another at angles other than 90 degrees and the cables may be interwoven or not.

Although the hold-down device of the present invention is ideally suited to a straddle carrier, the invention is not intended to be limited to such application since a hold-down device of the invention could be applied readily to other load handling machines and apparatus such as to the mast of an industrial lift truck.

Having described the invention in what is considered to be the preferred embodiment thereof, it is desired that it be understood that the invention is not to be limited other than by the provisions of the following claims.

We claim:

1. A vehicle having a frame, vertically movable load-supporting means on said frame, a hold-down unit above said supporting means and positioned to be engaged by a load when said load is elevated by said supporting means, said hold-down unit comprising a first series of parallel elongated flexible elements and a second series of parallel elongated flexible elements next to the elements of said first series and disposed in angular relation thereto, all of said elements being made of resilient material so as to be stretchable and extensible a substantial extent in a longitudinal direction so as to yield when engaged by a load, said frame providing an open framework having side portions and end portions rigidly connected together, and relatively non-stretchable coil connectors connecting the ends of the flexible elements to said open framework, said non-stretchable coil connectors each having an end portion pivotally connected to a pin on said open framework to provide for swinging movement of the ends of said flexible elements relative to said open framework to permit said flexible elements readily to yield when a load is pressed upwardly thereagainst, the flexible elements of said first series being unsecured to the elements of said second series so that each element may stretch and extend longitudinally without interference by any of the other elements to permit said elements readily to accommodate loads having uneven surface portions engaging said elements.

2. A vehicle having a frame, vertically movable load-supporting means on said frame, a hold-down unit above said supporting means and positioned to be engaged by a load when said load is elevated by said supporting means, said hold-down unit comprising a first series of parallel elongated flexible elements and a second series of parallel elongated flexible elements next to the elements of said first series and disposed in angular relation thereto, all of said elements being made of resilient material so as to be stretchable and extensible a substantial extent in a longitudinal direction so as to yield when engaged by a load, said frame providing an open framework having side portions and end portions rigidly connected together and relatively nonstretchable connectors connecting the ends of the flexible elements to said open framework, said nonstretchable connectors each having an end portion pivotally connected to a pin on said open framework to provide for swinging movement of the ends of said flexible elements relative to said open framework to permit said flexible elements readily to yield when a load is pressed upwardly thereagainst, the flexible elements of said first series being unsecured to the elements of said second series so that each element may stretch and extend longitudinally without interference by any of the other elements to permit said elements readily to accommodate loads having uneven surface portions engaging said elements.

3. A vehicle having a frame, vertically movable load-supporting means on said frame, a hold-down unit above said supporting means and positioned to be engaged by a load when said load is elevated by said supporting means, said hold-down unit comprising a first series of parallel elongated flexible elements and a second series of parallel elongated flexible elements next to the elements of said first series and disposed in angular relation thereto, all of said elements being made of resilient material so as to be stretchable and extensible a substantial extent in a longitudinal direction so as to yield when engaged by a load, said frame providing an open framework having side portions and end portions rigidly connected together and relatively nonstretchable connectors connecting the ends of the flexible elements to said open framework, said non-stretchable connectors pivotally connecting said elements to said open framework to provide for swinging movement of the ends of said flexible elements relative to said open framework to permit said flexible elements readily to yield when a load is pressed upwardly thereagainst, the flexible elements of said first series being unsecured to the elements of said second series so that each element may stretch and extend longitudinally without interference by any of the other elements to permit said elements readily to accommodate loads having uneven surface portions engaging said elements.

References Cited in the file of this patent

UNITED STATES PATENTS

| | | |
|---|---|---|
| 1,369,325 | Coopersmith | Feb. 22, 1921 |
| 1,676,638 | Eastham | July 10, 1928 |
| 1,966,893 | Harris | July 17, 1934 |